United States Patent
Cho et al.

(10) Patent No.: US 9,587,715 B1
(45) Date of Patent: Mar. 7, 2017

(54) PLANETARY GEAR TRAIN OF AUTOMATIC TRANSMISSION FOR VEHICLE

(71) Applicant: Hyundai Motor Company, Seoul (KR)

(72) Inventors: Wonmin Cho, Hwaseong-si (KR); Seong Wook Hwang, Gunpo-si (KR); Woo Jin Chang, Suwon-si (KR); Hyun Sik Kwon, Seoul (KR); Jae Chang Kook, Hwaseong-si (KR); Seongwook Ji, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/941,344

(22) Filed: Nov. 13, 2015

(30) Foreign Application Priority Data

Sep. 14, 2015 (KR) ........................ 10-2015-0129860

(51) Int. Cl.
*F16H 3/66* (2006.01)

(52) U.S. Cl.
CPC ......... *F16H 3/66* (2013.01); *F16H 2200/006* (2013.01); *F16H 2200/201* (2013.01); *F16H 2200/2046* (2013.01)

(58) Field of Classification Search
None
See application file for complete search history.

(56) References Cited

U.S. PATENT DOCUMENTS

| 8,096,914 | B2 | 1/2012 | Aota et al. | |
|---|---|---|---|---|
| 2007/0010367 | A1* | 1/2007 | Raghavan | F16H 3/66 475/275 |
| 2008/0119318 | A1* | 5/2008 | Phillips | F16H 3/663 475/276 |
| 2013/0150203 | A1* | 6/2013 | Park | F16H 3/663 475/276 |
| 2015/0167793 | A1* | 6/2015 | Beck | F16H 3/66 475/276 |
| 2016/0146306 | A1* | 5/2016 | Cho | F16H 3/66 475/269 |

FOREIGN PATENT DOCUMENTS

KR    10-2012-0121158 A    11/2012

\* cited by examiner

*Primary Examiner* — Justin Holmes
(74) *Attorney, Agent, or Firm* — Morgan, Lewis & Bockius LLP

(57) ABSTRACT

A planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, and a third planetary gear set including seventh, eighth, and ninth rotation elements.

9 Claims, 2 Drawing Sheets

FIG. 2

|     | C1 | C2 | C3 | C4 | C5 | B1 | gear ratio |
|-----|----|----|----|----|----|----|------------|
| D1  | o  |    |    | o  |    | o  | 3.500      |
| D2  | o  |    |    | o  | o  |    | 1.784      |
| D3  | o  |    | o  | o  |    |    | 1.289      |
| D4  | o  | o  |    | o  |    |    | 1.000      |
| D5  | o  | o  |    |    | o  |    | 0.850      |
| D6  | o  | o  | o  |    |    |    | 0.778      |
| D7  |    | o  | o  |    | o  |    | 0.714      |
| D8  |    | o  | o  | o  |    |    | 0.632      |
| REV |    | o  |    | o  |    | o  | 2.188      |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0129860, filed Sep. 14, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission for a vehicle that improves fuel economy by achieving eight forward speed stages using a minimum number of constituent elements and improves silent driving by using operation point at a low RPM region.

Description of Related Art

In recent years, a rise in oil price caused unlimited competition for enhancing fuel efficiency.

As a result, research is being conducted on engines in terms of reducing weight and improving fuel efficiency by down-sizing, and research is also being conducted for simultaneously securing operability and fuel efficiency competitiveness by implementing an automatic transmission with multiple speed stages.

However, in the automatic transmission, as the number of speed stages increase, the number of internal components increase, and as a result, the automatic transmission may be difficult to mount, the manufacturing cost and weight may be increased, and power transmission efficiency may be deteriorated.

Accordingly, development of a planetary gear train which may bring about maximum efficiency with a small number of components may be important in order to increase a fuel efficiency enhancement effect through the multiple speed stages.

In this aspect, in recent years, 8-speed automatic transmissions tend to be implemented and the research and development of a planetary gear train capable of implementing more speed stages has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving fuel economy by achieving eight forward speed stages and one reverse speed stage and of improving silent driving of the vehicle by using operation point positioned at a low RPM region.

According to various aspects of the present invention, a planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, and a third planetary gear set including seventh, eighth, and ninth rotation elements, in which the first rotation element may be directly connected to the seventh rotation element, the second rotation element may be directly connected to the ninth rotation element, the fourth rotation element may be directly connected to a transmission housing, the eighth rotation element may be directly connected to the output shaft, the input shaft may be selectively connected respectively to the first rotation element and the fifth rotation element, the second rotation element may be selectively connected to the sixth rotation element, the third rotation element may be selectively connected to the fifth rotation element and the sixth rotation element, respectively, and the ninth rotation element may be selectively connected to the transmission housing.

The first, second, and third rotation elements of the first planetary gear set may be a first sun gear, a first planet carrier, and a first ring gear, the fourth, fifth, and sixth rotation elements may be a second sun gear, a second planet carrier, and a second ring gear, and the seventh, eighth, and ninth rotation elements may be a third sun gear, a third planet carrier, and a third ring gear.

Each of the first, second, and third planetary gear sets may be a single pinion planetary gear set.

The planetary gear train may further include a first clutch selectively connecting the input shaft to the first rotation element, a second clutch selectively connecting the input shaft to the fifth rotation element, a third clutch selectively connecting the second rotation element to the sixth rotation element, a fourth clutch selectively connecting the third rotation element to the fifth rotation element, a fifth clutch selectively connecting the third rotation element to the sixth rotation element, and a first brake selectively connecting the ninth rotation element to the transmission housing.

According to various aspects of the present invention, a planetary gear train of an automatic transmission for a vehicle may include an input shaft receiving torque of an engine, an output shaft outputting changed torque, a first planetary gear set including first, second, and third rotation elements, a second planetary gear set including fourth, fifth, and sixth rotation elements, a third planetary gear set including seventh, eighth, and ninth rotation elements, a first rotation shaft connecting the first rotation element to the seventh rotation element and selectively connected to the input shaft, a second rotation shaft connecting the second rotation element to the ninth rotation element and selectively connected to a transmission housing, a third rotation shaft connected to the third rotation element, a fourth rotation shaft connected to the fourth rotation element and directly connected to the transmission housing, a fifth rotation shaft connected to the fifth rotation element and selectively connected to the input shaft and the third rotation shaft, respectively, a sixth rotation shaft connected to the sixth rotation element and selectively connected to the second rotation shaft and the third rotation shaft, respectively, and a seventh rotation shaft connected to the eighth rotation element and directly connected to the output shaft.

The first planetary gear set may be a single pinion planetary gear set and include a first sun gear as the first rotation element, a first planet carrier as the second rotation element, and a first ring gear as the third rotation element, the second planetary gear set may be a single pinion planetary gear set and include a second sun gear as the fourth rotation element, a second planet carrier as the fifth rotation element, and a second ring gear as the sixth rotation element, and the third planetary gear set may be a single pinion planetary gear set and include a third sun gear as the seventh rotation element, a third planet carrier as the eighth rotation element, and a third ring gear as the ninth rotation element.

The planetary gear train may further include a first clutch selectively connecting the input shaft to the first rotation shaft, a second clutch selectively connecting the input shaft to the fifth rotation shaft, a third clutch selectively connecting the second rotation shaft to the sixth rotation shaft, a fourth clutch selectively connecting the third rotation shaft to the fifth rotation shaft, a fifth clutch selectively connecting the third rotation shaft to the sixth rotation shaft, and a first brake selectively connecting the second rotation shaft to the transmission housing.

The first and fourth clutches and the first brake may be operated at a first forward speed stage, the first, fourth, and fifth clutches may be operated at a second forward speed stage, the first, third, and fourth clutches may be operated at a third forward speed stage, the first, second, and fourth clutches may be operated at a fourth forward speed stage, the first, second, and fifth clutches may be operated at a fifth forward speed stage, the first, second, and third clutches may be operated at a sixth forward speed stage, the second, third, and fifth clutches may be operated at a seventh forward speed stage, the second, third, and fourth clutches may be operated at an eighth forward speed stage, and the second and fourth clutches and the first brake may be operated at a reverse speed stage.

Various embodiments of the present invention may achieve eight forward speed stages and one reverse speed stage by combining three planetary gear sets with six control elements.

In addition, since eight forward speed stages are achieved by using three planetary gear sets, an internal structure of the automatic transmission may be simplified and durability may be improved.

Since fuel economy is improved due to achievement of multiple speed stages and operation point at low RPM regions is used, silent driving of the vehicle may be improved.

Further, effects obtained or predicted by the various embodiments of the present invention will be directly or suggestively described in the detailed description section. That is, various effects predicted according to the various embodiments of the present invention will be described in further detail in the detailed description section.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of control elements at each speed stage in the exemplary planetary gear train according to the present invention.

Figure 1:
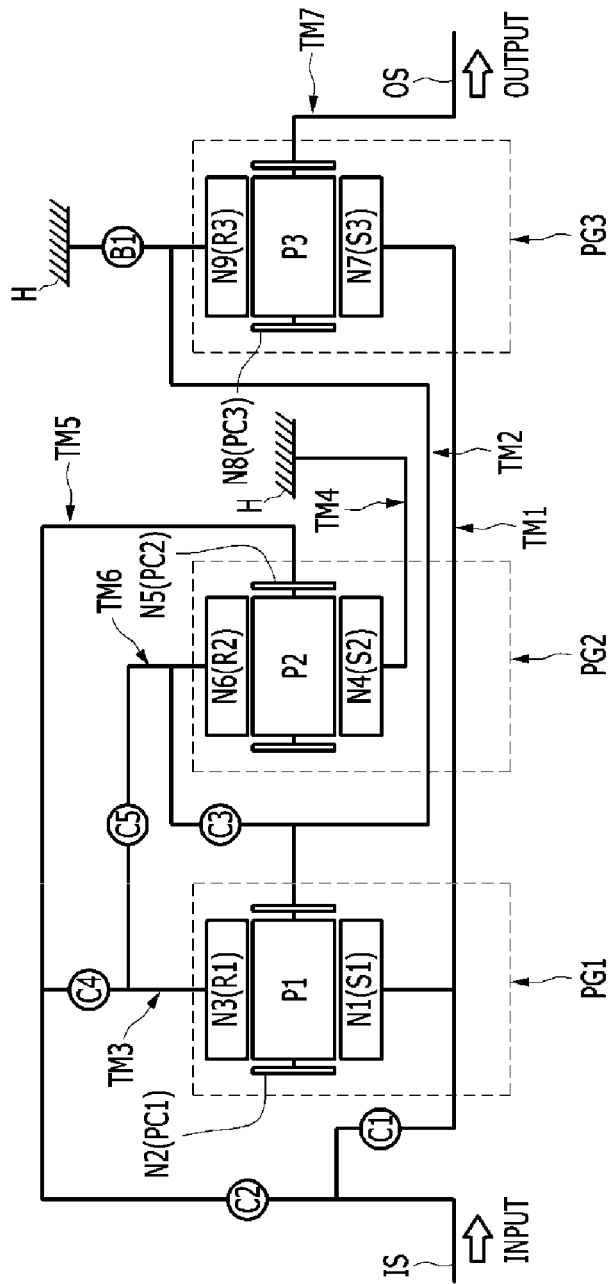
FIG. 1 is a schematic diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiments of the present invention.

Referring to FIG. 1, a planetary gear train according to various embodiments of the present invention includes first, second, and third planetary gear sets PG1, PG2, and PG3 disposed on the same axis, an input shaft IS, an output shaft OS, seven rotation shafts TM1 to TM7 connected to at least one of rotation elements of the first, second, and third planetary gear sets PG1, PG2, and PG3, six control elements C1 to C5, and B1, and a transmission housing H.

As a result, torque input from the input shaft IS is changed by cooperation of the first, second, and third planetary gear sets PG1, PG2, and PG3, and the changed torque is output through the output shaft OS.

The simple planetary gear sets are disposed in a sequence of the first, second, and third planetary gear sets PG1, PG2, and PG3 from an engine side.

The input shaft IS is an input member and power from a crankshaft of an engine is torque-converted through a torque converter to be input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The first rotation element N1 is directly connected to the seventh rotation element N7 and the second rotation element N2 is directly connected to the ninth rotation element N9 such that the first, second, and third planetary gear sets PG1, PG2, and PG3 are operated with seven rotation shafts TM1 to TM7.

The seven rotation shafts TM1 to TM7 will be described in further detail.

The first rotation shaft TM1 connects the first sun gear S1 to the third sun gear S3 and is selectively connected to the input shaft IS.

The second rotation shaft TM2 connects the first planet carrier PC1 to the third ring gear R3 and is selectively connected to the transmission housing H.

The third rotation shaft TM3 is connected to the first ring gear R1.

The fourth rotation shaft TM4 is connected to the second sun gear S2 and is directly connected to the transmission housing H so as to be continuously operated as a fixed element The fifth rotation shaft TM5 is connected to the second planet carrier PC2 and is selectively connected respectively to the input shaft IS and the third rotation shaft TM3.

The sixth rotation shaft TM6 is connected to the second ring gear R2 and is selectively connected respectively to the second rotation shaft TM2 and the third rotation shaft TM3.

The seventh rotation shaft TM7 is connected to the third planet carrier PC3 and is directly connected to the output shaft OS so as to be continuously operated as an output element.

In addition, five clutches C1, C2, C3, C4, and C5 being control elements are disposed at connection portions between any two rotation shafts among the rotation shafts TM1 to TM7 or between the input shaft IS and any one rotation shaft among the rotation shafts TM1 to TM7.

In addition, one brake B1 being control elements is disposed at a connection portion between any one rotation shaft among the rotation shaft TM1 to TM7 and the transmission housing H.

The six control elements C1 to C5 and B1 will be described in further detail.

The first clutch C1 is disposed between the input shaft IS and the first rotation shaft TM1 and selectively causes the input shaft IS and the first rotation shaft TM1 to integrally rotate with each other.

The second clutch C2 is disposed between the input shaft IS and the fifth rotation shaft TM5 and selectively causes the input shaft IS and the fifth rotation shaft TM5 to integrally rotate with each other.

The third clutch C3 is disposed between the second rotation shaft TM2 and the sixth rotation shaft TM6 and selectively causes the second rotation shaft TM2 and the sixth rotation shaft TM6 to integrally rotate with each other.

The fourth clutch C4 is disposed between the third rotation shaft TM3 and the fifth rotation shaft TM5 and selectively causes the third rotation shaft TM3 and the fifth rotation shaft TM5 to integrally rotate with each other.

The fifth clutch C5 is disposed between the third rotation shaft TM3 and the sixth rotation shaft TM6 and selectively causes the third rotation shaft TM3 and the sixth rotation shaft TM6 to integrally rotate with each other.

The first brake B1 is disposed between the second rotation shaft TM2 and the transmission housing H and causes the second rotation shaft TM2 to be operated as a selective fixed element.

The control elements including the first, second, third, fourth, and fifth clutches C1, C2, C3, C4, and C5 and the first brake B1 may be multi-plates friction elements of wet type that are operated by hydraulic pressure.

FIG. 2 is an operation chart of control elements at each speed stage in the planetary gear train according to various embodiments of the present invention.

As shown in FIG. 2, three control elements are operated at each speed stage in the planetary gear train according to various embodiments of the present invention.

The first and fourth clutches C1 and C4 and the first brake B1 are operated at a first forward speed stage D1. The input shaft IS is connected to the first rotation shaft TM1 by operation of the first clutch C1 and the third rotation shaft TM3 is connected to the fifth rotation shaft TM3 by operation of the fourth clutch C4. In a state that the torque of the input shaft IS is input to the first rotation shaft TM1, the fourth rotation shaft TM4 is operated as the fixed element and the second rotation shaft TM2 is operated as the fixed element by operation of the first brake B1. Therefore, the torque of the input shaft IS is shifted into the first forward speed stage, and the first forward speed stage is output to the output shaft OS through the seventh rotation shaft TM7.

The first, fourth, and fifth clutches C1, C4, and C5 are operated at a second forward speed stage D2. The input shaft IS is connected to the first rotation shaft TM1 by operation of the first clutch C1, the third rotation shaft TM3 is connected to the fifth rotation shaft TM3 by operation of the fourth clutch C4, and the third rotation shaft TM3 is connected to the sixth rotation shaft TM6 by operation of the fifth clutch C5. In a state that the torque of the input shaft IS is input to the first rotation shaft TM1, the fourth rotation shaft TM4 is operated as the fixed element. Therefore, the torque of the input shaft IS is shifted into the second forward speed stage, and the second forward speed stage is output to the output shaft OS through the seventh rotation shaft TM7.

The first, third, and fourth clutches C1, C3, and C4 are operated at a third forward speed stage D3. The input shaft IS is connected to the first rotation shaft TM1 by operation of the first clutch C1, the second rotation shaft TM2 is connected to the sixth rotation shaft TM6 by operation of the third clutch C3, and the third rotation shaft TM3 is connected to the fifth rotation shaft TM3 by operation of the fourth clutch C4. In a state that the torque of the input shaft IS is input to the first rotation shaft TM1, the fourth rotation shaft TM4 is operated as the fixed element. Therefore, the torque of the input shaft IS is shifted into the third forward speed stage, and the third forward speed stage is output to the output shaft OS through the seventh rotation shaft TM7.

The first, second, and fourth clutches C1, C2, and C4 are operated at a fourth forward speed stage D4. The input shaft IS is connected to the first rotation shaft TM1 by operation of the first clutch C1, the input shaft IS is connected to the fifth rotation shaft TM5 by operation of the second clutch C2, and the third rotation shaft TM3 is connected to the fifth rotation shaft TM3 by operation of the fourth clutch C4. In a state that the torque of the input shaft IS is input to the first rotation shaft TM1 and the fifth rotation shaft TM5, the fourth rotation shaft TM4 is operated as the fixed element. Therefore, the torque of the input shaft IS is shifted into the fourth forward speed stage, and the fourth forward speed stage is output to the output shaft OS through the seventh rotation shaft TM7.

The first, second, and fifth clutches C1, C2, and C5 are operated at a fifth forward speed stage D5. The input shaft IS is connected to the first rotation shaft TM1 by operation of the first clutch C1, the input shaft IS is connected to the fifth rotation shaft TM5 by operation of the second clutch C2, and the third rotation shaft TM3 is connected to the sixth rotation shaft TM6 by operation of the fifth clutch C5. In a state that the torque of the input shaft IS is input to the first rotation shaft TM1 and the fifth rotation shaft TM5, the fourth rotation shaft TM4 is operated as the fixed element. Therefore, the torque of the input shaft IS is shifted into the fifth forward speed stage, and the fifth forward speed stage is output to the output shaft OS through the seventh rotation shaft TM7.

The first, second, and third clutches C1, C2, and C3 are operated at a sixth forward speed stage D6. The input shaft IS is connected to the first rotation shaft TM1 by operation of the first clutch C1, the input shaft IS is connected to the fifth rotation shaft TM5 by operation of the second clutch C2, and the second rotation shaft TM2 is connected to the sixth rotation shaft TM6 by operation of the third clutch C3. In a state that the torque of the input shaft IS is input to the first rotation shaft TM1 and the fifth rotation shaft TM5, the fourth rotation shaft TM4 is operated as the fixed element. Therefore, the torque of the input shaft IS is shifted into the sixth forward speed stage, and the sixth forward speed stage is output to the output shaft OS through the seventh rotation shaft TM7.

The second, third, and fifth clutches C2, C3, and C5 are operated at a seventh forward speed stage D7. The input shaft IS is connected to the fifth rotation shaft TM5 by operation of the second clutch C2, the second rotation shaft TM2 is connected to the sixth rotation shaft TM6 by operation of the third clutch C3, and the third rotation shaft TM3 is connected to the sixth rotation shaft TM6 by operation of the fifth clutch C5. In a state that the torque of the input shaft IS is input to the fifth rotation shaft TM5, the fourth rotation shaft TM4 is operated as the fixed element. Therefore, the torque of the input shaft IS is shifted into the seventh forward speed stage, and the seventh forward speed stage is output to the output shaft OS through the seventh rotation shaft TM7.

The second, third, and fourth clutches C2, C3, and C4 are operated at an eighth forward speed stage D8. The input shaft IS is connected to the fifth rotation shaft TM5 by operation of the second clutch C2, the second rotation shaft TM2 is connected to the sixth rotation shaft TM6 by operation of the third clutch C3, and the third rotation shaft TM3 is connected to the fifth rotation shaft TM5 by operation of the fourth clutch C4. In a state that the torque of the input shaft IS is input to the fifth rotation shaft TM5, the fourth rotation shaft TM4 is operated as the fixed element. Therefore, the torque of the input shaft IS is shifted into the eighth forward speed stage, and the eighth forward speed stage is output to the output shaft OS through the seventh rotation shaft TM7.

The second and fourth clutches C2 and C4 and the first brake B1 are operated at a reverse speed stage REV. The input shaft IS is connected to the fifth rotation shaft TM5 by operation of the second clutch C2 and the third rotation shaft TM3 is connected to the fifth rotation shaft TM3 by operation of the fourth clutch C4. In a state that the torque of the input shaft IS is input to the first rotation shaft TM1, the fourth rotation shaft TM4 is operated as the fixed element and the second rotation shaft TM2 is operated as the fixed element by operation of the first brake B1. Therefore, the torque of the input shaft IS is shifted into the reverse speed stage, and the reverse speed stage is output to the output shaft OS through the seventh rotation shaft TM7.

The planetary gear train according to various embodiments of the present invention may achieve eight forward speed stages and one reverse speed stage by control of three planetary gear sets PG1, PG2, and PG3, five clutches C1, C2, C3, C4, and C5, and one brake B1.

Since eight forward speed stages are achieved by using three planetary gear sets PG1, PG2, and PG3, an internal structure of the automatic transmission may be simplified and durability may be improved.

Since fuel economy is improved due to achievement of multiple speed stages and operation point at low RPM regions is used, silent driving of the vehicle may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    an input shaft receiving torque of an engine;
    an output shaft outputting changed torque of the engine;
    a first planetary gear set including first, second, and third rotation elements;
    a second planetary gear set including fourth, fifth, and sixth rotation elements; and
    a third planetary gear set including seventh, eighth, and ninth rotation elements, wherein:
    the first rotation element is directly connected to the seventh rotation element,
    the second rotation element is directly connected to the ninth rotation element,
    the fourth rotation element is directly connected to a transmission housing,
    the eighth rotation element is directly connected to the output shaft,
    the input shaft is selectively connected respectively to the first rotation element and the fifth rotation element,
    the second rotation element is selectively connected to the sixth rotation element,
    the third rotation element is selectively connected to the fifth rotation element and the sixth rotation element, respectively, and
    the ninth rotation element is selectively connected to the transmission housing.

2. The planetary gear train of claim 1, wherein the first, second, and third rotation elements of the first planetary gear set are a first sun gear, a first planet carrier, and a first ring gear,
    the fourth, fifth, and sixth rotation elements are a second sun gear, a second planet carrier, and a second ring gear, and
    the seventh, eighth, and ninth rotation elements are a third sun gear, a third planet carrier, and a third ring gear.

3. The planetary gear train of claim 2, wherein each of the first, second, and third planetary gear sets comprises a single pinion planetary gear set.

4. The planetary gear train of claim 1, further comprising:
a first clutch selectively connecting the input shaft to the first rotation element;
a second clutch selectively connecting the input shaft to the fifth rotation element;
a third clutch selectively connecting the second rotation element to the sixth rotation element;
a fourth clutch selectively connecting the third rotation element to the fifth rotation element;
a fifth clutch selectively connecting the third rotation element to the sixth rotation element; and
a first brake selectively connecting the ninth rotation element to the transmission housing.

5. The planetary gear train of claim 4, wherein the first and fourth clutches and the first brake are operated at a first forward speed stage,
the first, fourth, and fifth clutches are operated at a second forward speed stage,
the first, third, and fourth clutches are operated at a third forward speed stage,
the first, second, and fourth clutches are operated at a fourth forward speed stage,
the first, second, and fifth clutches are operated at a fifth forward speed stage,
the first, second, and third clutches are operated at a sixth forward speed stage,
the second, third, and fifth clutches are operated at a seventh forward speed stage,
the second, third, and fourth clutches are operated at an eighth forward speed stage, and
the second and fourth clutches and the first brake are operated at a reverse speed stage.

6. A planetary gear train of an automatic transmission for a vehicle, comprising:
an input shaft receiving torque of an engine;
an output shaft outputting changed torque;
a first planetary gear set including first, second, and third rotation elements;
a second planetary gear set including fourth, fifth, and sixth rotation elements;
a third planetary gear set including seventh, eighth, and ninth rotation elements;
a first rotation shaft connecting the first rotation element to the seventh rotation element and selectively connected to the input shaft;
a second rotation shaft connecting the second rotation element to the ninth rotation element and selectively connected to a transmission housing;
a third rotation shaft connected to the third rotation element;
a fourth rotation shaft connected to the fourth rotation element and directly connected to the transmission housing;
a fifth rotation shaft connected to the fifth rotation element and selectively connected to the input shaft and the third rotation shaft, respectively;
a sixth rotation shaft connected to the sixth rotation element and selectively connected to the second rotation shaft and the third rotation shaft, respectively; and
a seventh rotation shaft connected to the eighth rotation element and directly connected to the output shaft.

7. The planetary gear train of claim 6, wherein the first planetary gear set comprises a single pinion planetary gear set and includes a first sun gear as the first rotation element, a first planet carrier as the second rotation element, and a first ring gear as the third rotation element,
the second planetary gear set comprises a single pinion planetary gear set and includes a second sun gear as the fourth rotation element, a second planet carrier as the fifth rotation element, and a second ring gear as the sixth rotation element, and
the third planetary gear set comprises a single pinion planetary gear set and includes a third sun gear as the seventh rotation element, a third planet carrier as the eighth rotation element, and a third ring gear as the ninth rotation element.

8. The planetary gear train of claim 6, further comprising:
a first clutch selectively connecting the input shaft to the first rotation shaft;
a second clutch selectively connecting the input shaft to the fifth rotation shaft;
a third clutch selectively connecting the second rotation shaft to the sixth rotation shaft;
a fourth clutch selectively connecting the third rotation shaft to the fifth rotation shaft;
a fifth clutch selectively connecting the third rotation shaft to the sixth rotation shaft; and
a first brake selectively connecting the second rotation shaft to the transmission housing.

9. The planetary gear train of claim 8, wherein the first and fourth clutches and the first brake are operated at a first forward speed stage,
the first, fourth, and fifth clutches are operated at a second forward speed stage,
the first, third, and fourth clutches are operated at a third forward speed stage,
the first, second, and fourth clutches are operated at a fourth forward speed stage,
the first, second, and fifth clutches are operated at a fifth forward speed stage,
the first, second, and third clutches are operated at a sixth forward speed stage,
the second, third, and fifth clutches are operated at a seventh forward speed stage,
the second, third, and fourth clutches are operated at an eighth forward speed stage, and
the second and fourth clutches and the first brake are operated at a reverse speed stage.

* * * * *